Figure 1:
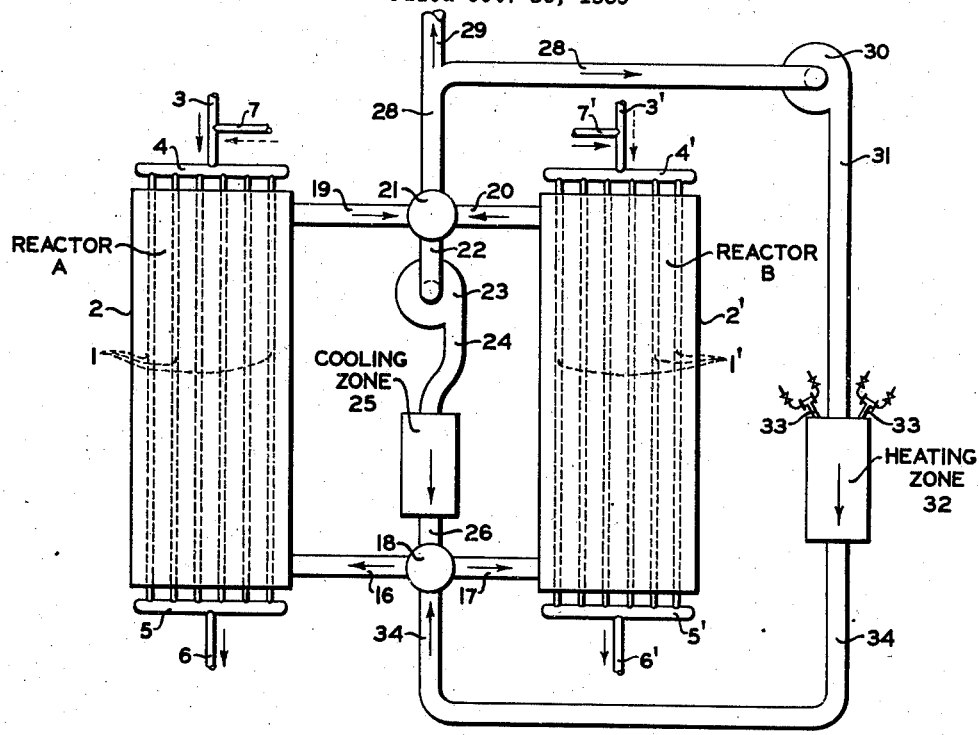

July 14, 1942.   L. A. MEKLER   2,289,922
CONTROL OF ENDOTHERMIC AND EXOTHERMIC REACTIONS
Filed Oct. 30, 1939

PROCESSING IN A
REACTIVATING IN B

CONDITIONING

REACTIVATING IN A
PROCESSING IN B

CONDITIONING

INVENTOR
LEV A. MEKLER
BY *Lee J. Gary*
ATTORNEY

Patented July 14, 1942

2,289,922

UNITED STATES PATENT OFFICE 2,289,922

CONTROL OF ENDOTHERMIC AND EXOTHERMIC REACTIONS

Lev A. Mekler, Chicago, Ill., assignor to Universal Oil Products Company, Chicago, Ill., a corporation of Delaware Application October 30, 1939, Serial No. 301,982

6 Claims. (Cl. 196—52)

The invention relates to an improved method of controlling the temperatures of endothermic and exothermic reactions simultaneously conducted in separate reactors, each of which is alternately employed as a zone of endothermic reaction and a zone of exothermic reaction.

During normal operation of the system, a stream of convective fluid is circulated through the reactor in which the endothermic reaction is taking place in indirect heat transfer relation with the reactants undergoing conversion therein to supply heat to the reaction and maintain the desired reaction temperature, the resulting cooled fluid being removed from the reactor, reheated to the desired temperature level and thence returned to the same reactor. Simultaneously, a separate stream of convective fluid is passed through the reactor in which the exothermic reaction is taking place in indirect heat transfer relation with the reactants therein to abstract heat from the exothermic reaction and maintain the desired temperature in this zone, the resulting heated fluid being removed from this reactor, cooled to the desired temperature level and thence returned to the same reactor. In order that cooling and heating of the streams of fluid exterior to the reactors may continue without interruption, after the zones of endothermic and exothermic reaction are shifted with respect to the reactors, the stream from which heat is removed, exterior to the reactors, is diverted to and through the reactor to which the exothermic reaction has been transferred and the stream to which heat is added, exterior to the reactors, is diverted to that reactor to which the endothermic reaction has been transferred.

However, in processes involving simultaneously conducted endothermic and exothermic reactions, the two reactions can seldom be satisfactorily conducted at the same temperature level. The temperature conditions in the reactors must therefore be rapidly changed when the zones of endothermic and exothermic reaction are shifted with respect to the reactors and, to accomplish this, I provide a short period of operation immediately preceding each shifting of the reaction zones during which the convective fluid in the reactor wherein the endothermic reaction is being completed is transferred to the reactor wherein the endothermic reaction will be continued, while the convective fluid in the reactor wherein the exothermic reaction is being completed is transferred to the reactor wherein the exothermic reaction will be continued. This is accomplished by employing series flow of the convective fluid through the reactors during this relatively short preconditioning period.

This method of operation not only provides for continuous and substantially uniform operation of the heating and cooling means provided exterior to the reactors, as well as continuous operation of the propulsion means in each stream under substantially constant conditions of temperature and load, but also permits, during normal operation, the circulation, when desired, of a smaller quantity of fluid through one of the reactors than that circulated through the other. These are all advantages which cannot be obtained in any of the previously proposed systems of temperature control of which I am aware.

The invention contemplates the use of any suitable fluid either vaporous, gaseous or liquid as the heat transfer medium for circulation about the zones of endothermic and exothermic reaction. Neither is the system of temperature control provided by the invention limited to the use of any specific variety of endothermic or exothermic reaction so long as said reactions are conducted simultaneously in separate reactors and the zones of endothermic and exothermic reaction are periodically transferred from one reactor to the other. However, the features of the invention are particularly advantageous as applied to endothermic conversion reaction such as the catalytic cracking and catalytic dehydrogenation of hydrocarbons, the exothermic reaction comprising periodic reactivation of the catalyst in situ by burning therefrom deleterious combustibles such as carbon or heavy carbonaceous material deposited thereon during the endothermic reaction. I have therefore chosen a hydrocarbon conversion process of this type to more concretely illustrate the features and advantages of the invention in the accompanying drawing and following description thereof. Also, in the system illustrated and subsequently described, I have chosen combustion gases as the convection fluid since this permits the addition of fresh increments of hot combustion gases to the cycle serving the endothermic reaction as a simple and efficient means of maintaining this stream at the required temperature level and since combustion gases are a cheap and almost universally applicable heat exchange medium.

In the accompanying drawing,

Fig. 1 is essentially a flow diagram of a system incorporating the features of the invention.

Figs. 2, 3, 4 and 5 illustrate varying relative positions of the dampers in switching zones 21 and 18 of Fig. 1.

Referring to the drawing, Fig. 1 indicates that substantially identical reactors A and B are provided. These reactors are of the heat exchange type, i. e., with provision for circulating a convective fluid through the reactor in indirect heat transfer relation with the reactants undergoing treatment therein. In this particular instance, the reactions take place within tubular elements indicated by the reference numerals 1 and 1' of the respective reactors A and B. The tubes extend through jackets 2 and 2' of the reactors and a convective medium such as combustion gases is circulated through the jacket of each reactor in contact with the exterior surface of the tubular elements through which heat is transferred to or from the convective medium, as the case may be. Each of the tubular elements of the reactors is substantially filled with contact mass such as catalytic material which, while in active state, is capable of promoting the endothermic reaction and upon which heavy carbonaceous materials are deposited and eventually reduce the activity of the catalyst to such an extent that they must be burned therefrom to restore the activity of the catalyst and permit its further use.

The stream of hydrocarbons to be treated, such as, for example, hydrocarbon gases to be catalytically dehydrogenated is supplied alternately to reactors A and B through the respective inlet lines 3 and 3' through switching valves or any other suitable form of stream-directing means which do not constitute a novel part of the invention and are therefore not illustrated. Lines 3 and 3' communicate with the respective headers 4 and 4' which, in turn, communicate with the tubular elements 1 and 1', respective, whereby the hydrocarbon vapors to be converted pass into direct contact with the catalytic material disposed within the tubes. Prior to this contact with the catalyst, the oil vapors are heated in any suitable well known manner, not illustrated, to a temperature at which active conversion thereof will take place upon such contact. The endothermic conversion reaction continues as the hydrocarbons pass through the tubular elements in contact with the catalyst by virtue of the reaction temperature at which they are maintained by the convective medium circulated about the tubes.

The tubular elements 1 and 1' terminate in the respective headers 5 and 5' from which conversion products of the reaction are discharged through the respective lines 6 and 6'. Lines 6 and 6' joint a suitable stream-directing mechanism of any conventional form such as a switching valve or a valved manifold arrangement, not illustrated, through which the products of the endothermic reaction are continuously supplied from the reactor in which this reaction is taking place to suitable separating and recovery equipment which does not constitute a novel part of the invention and is not illustrated.

After a predetermined period of operation, during which the endothermic reaction takes place in one of the reactors and heavy carbonaceous conversion products are deposited on the catalyst in this zone, the stream of hydrocarbons to be converted is diverted to the other reactor and the deposited carbonaceous material is burned from the catalyst in the first reactor by passing a stream of hot oxygen-containing gases therethrough to reactivate the catalyst, while the endothermic reaction progresses simultaneously in the reactor to which the stream of hydrocarbons has been diverted.

The oxygen-containing reactivating gases are directed at a temperature suitable for initiating combustion of the carbonaceous material upon contact therewith into the tubes of the reactor in which reactivation is taking place, lines 7 and 7' communicating with the headers 4 and 4', respectively, being provided for the introduction of the oxygen-containing gas stream into the respective reactors A and B. A switching valve or other suitable stream-directing mechanism of any well known form, not illustrated, is employed for selectively directing the reactivating gas stream to the desired reactor. In passing through the tubes of the reactor in which reactivation of the catalyst is taking place, the oxygen-containing gases burn the deleterious carbonaceous material from the catalyst and heat is supplied from the resulting combustion products through the tubes to the convective medium circulated about the latter to prevent the temperature of the exothermic reaction from reaching a level at which damage to the catalyst would result. The spent or partially spent reactivating gases and combustion products resulting from burning of the carbonaceous material are discharged from the tubes of the respective reactors A and B through headers 5 and 5' and the respective lines 6 and 6' to the aforementioned switching mechanism, not illustrated, whereby they are discharged from the system or, as an alternative, they may be supplied to suitable equipment, not illustrated, for removing deleterious materials therefrom, renewing their oxygen content, reheating the same to the desired temperature and recirculating them to the reactor in which reactivation of the catalyst is taking place. Such equipment may be of any desired conventional form and is not illustrated in the drawing.

As previously mentioned, combustion gases are utilized in the case here illustrated as the convective medium for supplying heat to the endothermic reaction and abstracting heat from the exothermic reaction. The circulating system for the combustion gases comprises ducts 16 and 17 leading, respectively, from switching zone 18 into the space surrounding the tubes of the respective reactors A and B and ducts 19 and 20 leading, respectively, from the space surrounding the tubes of reactors A and B to the switching zone 21. Duct 22 connects the switching zone 21 with the propulsion means 23, such as a blower or compressor, which discharges the combustion gases supplied thereto through duct 24 to cooling zone 25, which preferably comprises a heat exchanger of any desired conventional form capable of cooling the combustion gases to the desired temperature. The resulting cooled combustion gases are directed from cooling zone 25 through duct 26 to switching zone 18, wherefrom they are directed through duct 16 or duct 17, as the case may be, to the desired reactor. Switching zone 21 also communicates through duct 28 with another blower, compressor or the like 30 wherethrough another stream of combustion gases is directed from zone 21 and thence supplied through duct 31 to heating zone 32 which, in the particular case here illustrated, comprises a combustion zone wherein fuel and air supplied thereto through burners 33 are burned in sufficient quantities to reheat the cooler combustion gases from member 30 to the desired temperature. However, when desired, a heat exchanger or the like of any conventional form may be employed as the heating zone. The reheated combustion gases are directed from heating zone 32 through duct 34 to switching zone 18 which directs them through duct 16 or 17, as the case may be, to the desired reactor.

Any suitable means may be employed within the scope of the invention for selectively directing the combustion gas streams supplied to zone 18 through ducts 26 and 34, each to the desired reactor through the respective ducts 16 and 17 and this also applies to the stream-directing mechanism employed in zone 21 by means of which the combustion gas stream supplied thereto through ducts 19 and 20 are selectively directed to the heating zone and to the cooling zone. In the case here illustrated, reversible dampers indicated at 35 and 36 in Figs. 2 to 5, inclusive, are employed in the respective switching zones 18 and 21 and the position of these dampers during different portions of the operating cycle are indicated in Figs. 2, 3, 4 and 5. Reversal of the position of these dampers changes the path of flow of the combustion gases utilized as the convective medium, as will now be explained.

Figure 2:
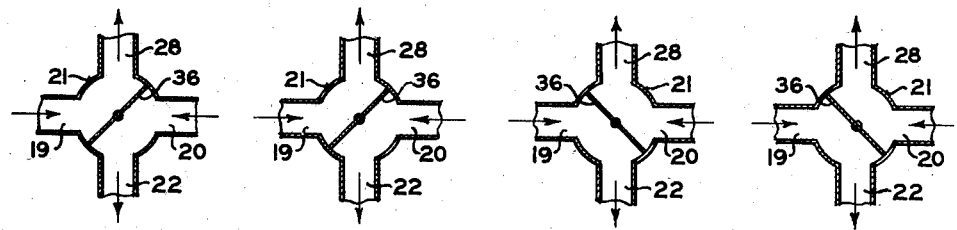
Figure 2:
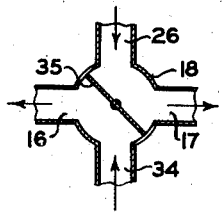

For a major portion of that stage of the operation during which the endothermic reaction is taking place in reactor A and the exothermic reaction is taking place in reactor B, the switching dampers 35 and 36 are in the position indicated in Fig. 2. While they remain in this position, combustion gases cooled by the transfer of heat therefrom to the endothermic reaction flow from reactor A through duct 19, switching zone 21 and duct 28 to blower or compressor 30, thence through duct 31 to heating zone 32, wherein their temperature is increased to the desired value by the addition of fresh increments of hotter combustion gases in this zone, and the thus reheated gases are directed through duct 34, switching zone 18 and duct 16 back to reactor A to complete the heating cycle.

During this same period of operation, combustion gases to which heat has been supplied from the exothermic reaction are directed from reactor B through duct 20, switching zone 21 and duct 22 to blower or compressor 23 and thence through duct 24 to cooler 25, wherein their temperature is reduced to the desired value and from which the resulting cooled gases are directed through duct 26, switching zone 18 and duct 17 back to reactor B to complete the cooling cycle.

Figure 4:
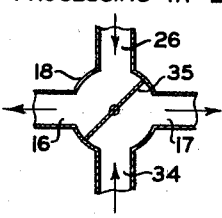

For a major portion of the period of operation during which the endothermic reaction is taking place in reactor B and the exothermic reaction is taking place in reactor A, dampers 35 and 36 are in the position indicated in Fig. 4. During this period of operation, combustion gases which have given up heat to the endothermic reaction are directed from reactor B through duct 20, switching zone 21 and duct 28 to blower or compressor 30 and thence through duct 31 to heating zone 32, wherein their temperature is increased to the desired value by the addition of fresh increments of hotter combustion gases, and the resulting reheated gases are directed therefrom through duct 34, switching zone 18 and duct 17 back to reactor B to complete the heating cycle.

During this same period of operation, the combustion gases to which heat has been supplied from the exothermic reaction are directed from reactor A through duct 19, switching zone 21 and duct 22 to blower or compressor 23, thence through duct 24 to cooler 25 wherein their temperature is reduced to the desired value and wherefrom the resulting cooled gases are directed through duct 26, switching zone 18 and duct 16 back to reactor A to complete the cooling cycle.

Figure 3:
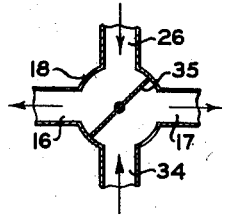

For a relatively short time preceding the switching of the stream of hydrocarbon reactants from reactor A to reactor B and the switching of the reactivating gas stream from reactor B to reactor A, dampers 35 and 36 are in the position shown in Fig. 3 and the flow through the system is as follows: The gases to which heat has been supplied from the exothermic reaction are directed from reactor B through duct 20, switching zone 21 and duct 22 to blower or compressor 23, thence through duct 24 to cooler 25 wherein their temperature is decreased and wherefrom the cooled gases are supplied through duct 26, switching zone 18 and duct 16 to reactor A, while the gases which have given up heat to the endothermic reaction in reactor A are directed therefrom through duct 19, switching zone 21 and duct 28 to blower or compressor 30 and thence through duct 31 to heating zone 32 wherein their temperature is increased as hereinbefore explained and wherefrom the resulting heated gases are directed through duct 34, switching zone 18 and duct 17 back to reactor B to complete the cooling and heating cycle. Thus, prior to the switching of streams of hydrocarbon reactants and reactivating gases with respect to the reactors, the reactor in which the endothermic reaction is about to be completed is preconditioned for the subsequent reactivation in this zone by reducing its temperature to a level at which said reactivation can be successfully conducted, while the reactor in which reactivation is about to be completed is preconditioned for subsequent processing of hydrocarbons in this zone by increasing its temperature to a level suitable for conducting the hydrocarbon conversion reaction.

Figure 5:
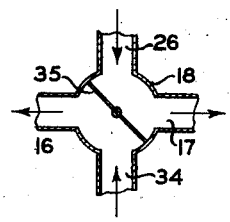

Likewise, to precondition reactor A for processing and precondition reactor B for reactivation, for a short period preceding switching of the stream of hydrocarbons from reactor B to reactor A and switching of the stream of reactivating gases from reactor A to reactor B, dampers 35 and 36 are in the position indicated in Fig. 5 and the flow through the system is as follows: The gases to which heat has been supplied from the exothermic reaction taking place in reactor A are directed therefrom through duct 19, switching zone 21 and duct 22 to blower or compressor 23 and thence through duct 24 to cooler 25 wherein their temperature is reduced to the desired value and wherefrom the resulting cooled gases are directed through duct 26, switching zone 18 and duct 17 to reactor B, while the gases from which heat has been supplied to the endothermic reaction taking place in reactor B are directed therefrom through duct 20, switching zone 21 and duct 28 to blower or compressor 30 and thence through duct 31 to heating zone 32 wherein their temperature is increased to the desired value in the manner previously explained and wherefrom the resulting heated gases are directed through duct 34, switching zone 18 and duct 16 to reactor A, to complete the heating and cooling cycle.

The following is an example of one specific operation of the process, as conducted in a system such as illustrated in the drawing, when the latter is employed to catalytically dehydrogenate butanes: butane charging stock, heated to a temperature of approximately 1075° F., is supplied alternately to the two reactors at the rate of approximately 14,500 pounds per hour and contacted in the tubular elements of the reactor with the activity dehydrogenating catalyst which, in this instance, consists of approximately 10% chromium sesquioxide on alumina. The resulting butenes, unconverted butanes, hydrogen and the relatively small amount of lighter gases formed in the reaction are discharged from the reactor in which dehydrogenation is taking place to suitable separating and fractionating equipment.

Simultaneously, combustion gases containing controlled minor amounts of air are supplied at a temperature of about 900° F. to the other reactor in which reactivation of the catalyst is taking place and resulting spent or partially spent reactivating gases and combustion products formed by burning of the deposited carbonaceous material from the catalyst are discharged from this reactor at a temperature of approximately 1150° F.

When reactivation of the catalyst is completed in a given reactor, the introduction of air to the stream of hot combustion gases employed as the reactivating gas stream is discontinued for a sufficient period to substantially purge this reactor of oxygen-containing gases, following which the stream of heated butanes is supplied to this zone and the stream of oxygen-free combustion gases is diverted to the other reactor to substantially purge the latter of hydrocarbon gases. When the latter purge is completed oxygen is again supplied in controlled amounts to the stream of combustion gases utilized as the reactivating gas stream and reactivation of the catalyst is accomplished in the last mentioned reactor.

To maintain the outlet temperatures, above specified, from the reactors, during a major portion of each operating cycle combustion gases generated in zone 32 are supplied to the reactor in which dehydrogenation is taking place at a temperature of approximately 1550° F. and at the rate of approximately 37,000 pounds per hour. They emerge from this reactor at a temperature of approximately 1200° F. and are, in part, recycled through heating zone 32 back to the same reactor. A sufficient quantity of hotter combustion gases is added to the stream in zone 32 to increase the temperature of the 1200° F. gases to approximately 1550° F. and the excess gases are removed from the cycle through duct 29, fan or blower 30 being operated at a substantially constant speed to deliver approximately 37,000 pounds per hour of 1200° F. gases. Simultaneously, during a major portion of each operating cycle, combustion gases utilized as the heat transfer medium are delivered to the reactor in which reactivation of the catalyst is taking place at a temperature of approximately 950° F. and at the rate of approximately 30,350 pounds per hour. They pass from this reactor at a temperature of approximately 980° F. and are recycled through cooling zone 25 back to the same reactor, the cooling zone being operated to reduce the temperature of the gases from approximately 980° F. to approximately 950° F.

To shift the relatively hot combustion gases utilized as the heat transfer medium in the reactor where in dehydrogenation has been taking place to the other reactor to which dehydrogenation is about to be continued, and shift the relatively cool combustion gases utilized as the heat transfer medium in the reactor wherein reactivation of the catalyst is taking place to the other reactor wherein reactivation of the catalyst is about to be started, the position of damper 35 in switching device 18 is reversed shortly prior to the switching of the butane and reactivating gas streams and for a short time the 1550° F. gases from heating zone 32 are supplied to the reactor in which reactivation of the catalyst is being completed and the 950° F. gases from cooling zone 25 are supplied to the reactor in which dehydrogenation is being completed. Then, when the conditions which formerly prevailed in the two reactors are approximately reversed, the position of stream-directing member 36 in switching device 21 is reversed and parallel flow of the two streams of heat transfer liquid through the two reactors is thereby again established.

The period during which series flow of the heat transfer fluid through the reactors is maintained will correspond roughly to the purging periods in the two reactors, but since the exact duration of the period of series flow is difficult to predict it may be adjusted during operation to suit requirements. It will in most instances be somewhat shorter than the two purging periods and will seldom exceed the time required for purging, although it is not intended to so limit the invention.

In the specific operation above described, the cycle (i. e., from the completion of purging in the reactor wherein dehydrogenation has been taking place to the start of the succeeding dehydrogenation step in this zone) is approximately 60 minutes and approximately 3 minutes are required for purging in each reactor. Since the purging period in the reactor wherein dehydrogenation is being completed follows that in the reactor in which reactivation of the catalyst is being completed, approximately 6 minutes is required for purging in the two reactors, the hydrocarbon reactants and reactivating gases being switched with respect to the reactors at the midpoint in this 6 minute period. The switching of stream-directing member 35 precedes switching of the streams of hydrocarbon reactants and reactivating gases by approximately 2 minutes and approximately 4 minutes are required to precondition the reactors so that stream-directing member 36 is shifted approximately 2 minutes after the streams of hydrocarbon reactants and reactivating gases are switched.

I claim as my invention:

1. A process which comprises effecting an endothermic reaction in a first reaction zone, simultaneously effecting an exothermic reaction in a second reaction zone, circulating a heated stream of convective fluid in indirect heat exchange relation with said first zone to supply heat to this zone, circulating a relatively cool stream of convective fluid in indirect heat exchange relation with said second zone to abstract heat from the latter, shifting the endothermic reaction from the first to the second zone and the exothermic reaction from the second to the first zone after a period of operation as aforesaid, and, immediately preceding said shifting, passing convective fluid of the first-mentioned stream in indirect heat exchange relation with said second zone and passing convective fluid of the second-mentioned stream in indirect heat exchange relation with the first zone, whereby to precondition the second zone for the endothermic reaction and the first zone for the exothermic reaction.

2. A process which comprises effecting an endothermic reaction in a first reaction zone, simultaneously effecting an exothermic reaction in a second reaction zone, circulating a stream of convective fluid in a cycle which includes a heating zone and a heat exchange zone surrounding said first reaction zone, whereby to supply heat to the first zone, circulating an independent stream of convective fluid in a separate cycle which includes a cooling zone and a heat exchange zone surrounding said second reaction zone, whereby to abstract heat from the latter, shifting the endothermic reaction from the first to the second zone and the exothermic reaction from the second to the first zone after a period of operation as aforesaid, and, immediately preceding said shifting, passing convective fluid from the first-mentioned cycle through the second-mentioned heat exchange zone and passing convective fluid from the second-mentioned cycle through the first-mentioned heat exchange zone, whereby to precondition the second reaction zone for the endothermic reaction and the first reaction zone for the exothermic reaction.

3. The process as defined in claim 2 further characterized in that the convective fluid circulating in said cycles comprises combustion gases, the convective fluid of the first-mentioned cycle being heated in said heating zone by supplying thereto fresh increments of hotter combustion gases.

4. The process as defined in claim 1 further characterized in that said endothermic reaction is a catalytic, carbon-forming hydrocarbon conversion while the exothermic reaction involves the burning of deposited carbonaceous matter from catalyst previously employed in the hydrocarbon conversion.

5. The process as defined in claim 2 further characterized in that said endothermic reaction is a catalytic, carbon-forming hydrocarbon conversion while the exothermic reaction involves the burning of deposited carbonaceous matter from catalyst previously employed in the hydrocarbon conversion.

6. The process as defined in claim 1 further characterized in that said convective fluid comprises combustion gases.

LEV A. MEKLER.